J. S. MELCHERS.
CENTRIFUGAL BLOWER.
APPLICATION FILED JULY 6, 1911.
1,109,133.
Patented Sept. 1, 1914.
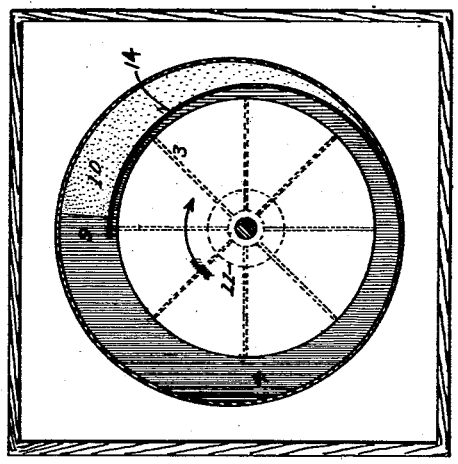
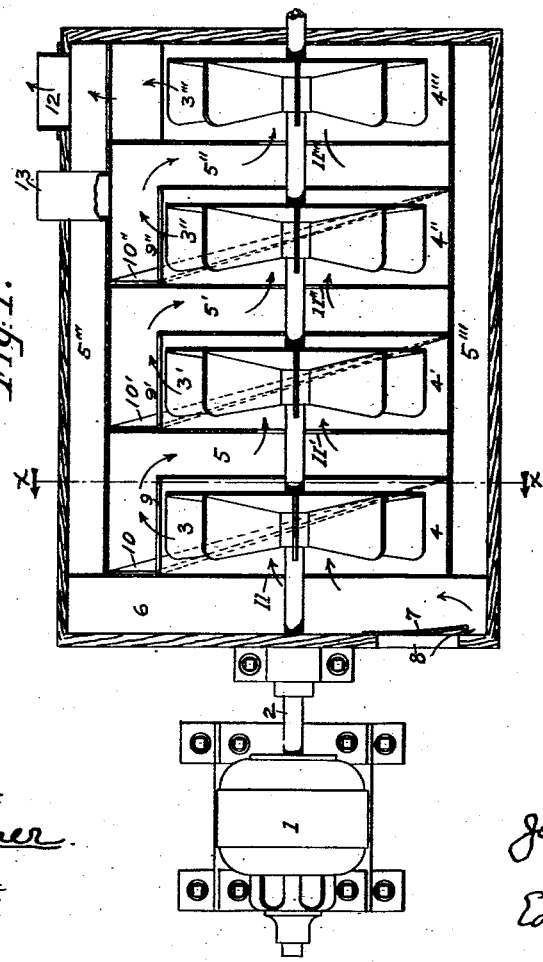
WITNESSES:
L. H. Latimer
E. C. Otto.
INVENTOR
John S. Melchers
BY
Edwin W. Hammer.
ATTORNEY

UNITED STATES PATENT OFFICE.

JOHN S. MELCHERS, OF NEW YORK, N. Y.

CENTRIFUGAL BLOWER.

1,109,133.  Specification of Letters Patent.  Patented Sept. 1, 1914.

Application filed July 6, 1911. Serial No. 637,212.

*To all whom it may concern:*

Be it known that I, JOHN S. MELCHERS, a citizen of the United States, and a resident of the borough of Brooklyn, city of New York, and State of New York, have invented certain new and useful Improvements in Centrifugal Blowers, of which the following is a specification, reference being had to the accompanying drawings, forming part thereof.

This invention relates to centrifugal blowers of the volute type, in which air is drawn in at the center of a fan eccentrically disposed in a containing chamber and discharged at the ends of the fan-blades.

It is directed especially to the compounding of blowers, the securing of silent operation, the reduction of undesirable back-pressures and the minimizing of temperature rises in the apparatus. I attain these various objects by the construction, arrangement and combination of the parts illustrated in the drawings attached hereto and hereinafter described, in the course of which description I will point out how the specific objects and advantages are secured.

In the accompanying drawings, Figure 1 is a plan view of a quadri-compound blower embodying my invention, driven by electric motor; Fig. 2 is a cross-section view of such blower at the line x—x of Fig. 1, looking toward the motor.

Like reference numerals apply to like parts.

Referring now to the drawings, it may be said that any desired prime mover may be employed to drive the blower, but in Fig. 1 I have, for convenience, shown such prime mover as an electric motor 1, directly connected to the blower shaft 2 upon which are mounted the fans 3, 3', 3'', 3''' used for compounding or stepping-up the pressures to be secured. Each fan is in its own volute chamber 4 (or 4', 4'', 4'''), being eccentrically mounted therein so as to have the ends of the fan-blades nearer the wall of the chamber at one point than at any others, as shown more clearly in Fig. 2. Each fan 3, etc., has an auxiliary chamber 5 (or 5', 5'', 5'''), into which it exhausts its compressed air; in the preferred embodiment of my invention illustrated, the last compression chamber 5''' surrounds all the fan-chambers and other compression chambers; for reasons which will presently appear. At one end of the device is an intake chamber 6 with an entrance-port 8 and flap-valve 7; the first fan 3 draws its air through the opening 11 from the intake-chamber 6, near the center of the fan. Each fan-chamber 4, for example, opens into its compression-chamber 5 by way of an open port 9, the air being deflected into the chamber 5 by the slanting partition 10 and the eccentric wall 14 of the volute fan chamber 4. When more than a single blower unit is employed, air may be taken from any compression-chamber 5, 5', 5'', 5''', each chamber furnishing a different pressure. Fig. 1 shows two air-taps 12 and 13, which may be of a size depending on the quantity of air to be used, the outlet 12 supplying air at a higher pressure than the outlet 13.

A blower embodying features of my invention may comprise a rotary fan 3, a volute fan-chamber 4, an air-inlet 11, an outlet 9 into a compression-chamber 5, from which the compressed air may be drawn. This would be a single-unit blower. Two of such units would form a compound-blower, giving higher pressures. Still higher compression may be secured by tri-compounding through the use of three units, etc. Whatever the number of units employed, there is a compression-chamber between each two fan-chambers. The use of a high-speed blower without my compression-chamber is accompanied by a roar or rumble which is very disagreeable and annoying, particularly as the principal use for such blower is in connection with church organs and the like. The use of my compression-chambers acts to dampen the vibrations of the fan and fan-casings and renders the operation of the device substantially noiseless. The surrounding chamber 5''' serving as compression-chamber for the last blower-fan, adds to the general effectiveness in this regard. I am able to avoid the use of a thrust bearing on my fan-shaft by reason of the steadying action of the compression-chambers on the fans; this is a new and highly-useful feature. Another advantage coming from the use of my invention lies in the fact that the temperature of the air is kept low through the use of my compression chambers and the arrangement of parts. It will be understood that a church-organ is not played constantly through a service, but that it must be kept ready to play at substantially any time desired; this means that the fans must be kept revolving even if no air is being drawn into the organ. I have found that where my compression chamber is employed the temperature of the air in the blower will not rise more than about 10° F. above the temperature of the surrounding air within 30 minutes, whereas the simple churning of the air without a compression-chamber will raise its temperature 20° or more above that point within the same time; this improved action with my device is doubtless due to the larger volume of air acted upon by each fan and the opportunity afforded for more or less circulation of the air in and out of the compression-chamber with consequently improved radiation. I have found that the best results are secured where the compression-chamber is of substantially the maximum width of the fan-blades.

I do not desire to limit my invention to the precise embodiment of it which I have here illustrated and described, but

What I claim and wish to protect by Letters-Patent of the United States is:

1. A compound centrifugal blower comprising a plurality of fans, a volute fan-chamber for each fan, a compression chamber interposed between each pair of fan-chambers and one or more outlets for the compressed air.

2. A compound centrifugal blower comprising a plurality of fans, a volute fan-chamber for each fan, a compression-chamber interposed between each pair of fan-chambers and a high-pressure chamber surrounding the several blower units.

3. A centrifugal blower consisting of a fan, a fan-chamber with an air-inlet near the center of the fan, an air-outlet, such as 9, opening into a compression chamber through a gradually-diminishing passage comprised between the eccentric wall 14 of the fan-chamber, the diagonally-disposed partition 10 and the outer casing of the fan-chamber.

4. In a compound centrifugal blower comprising a plurality of fans and a volute fan chamber for each fan, means for preventing the over-heating of air therein consisting in the provision of a storage chamber adjacent to each fan chamber within which the compressed air may be stored without being churned by the fans.

5. In a compound centrifugal blower comprising a plurality of fans each in its own chamber, means for suppressing the vibration of the walls thereof consisting in the provision of a separate compression chamber for each fan chamber, one of such compression chambers substantially surrounding the fan chambers.

6. A compound centrifugal blower comprising a plurality of fans, a volute fan chamber for each fan, a compression chamber interposed between each pair of fan chambers, and an outlet for the compressed air.

7. In a compound centrifugal blower comprising a plurality of fans and a volute fan chamber for each fan, a storage chamber adjacent each fan chamber within which the compressed air may be stored without being churned by the fans.

JOHN S. MELCHERS.

Witnesses:
EDWIN W. HAMMER,
JOHN S. McCARTHY.